(12) United States Patent
Moenkemoeller

(10) Patent No.: US 10,634,599 B2
(45) Date of Patent: Apr. 28, 2020

(54) PARTICLE-MEASURING APPARATUS

(71) Applicant: paragon ag, Delbrueck (DE)

(72) Inventor: Ralf Moenkemoeller, Bielefeld (DE)

(73) Assignee: paragon GMBH & Co. KGaA, Delbrueck (DE)

( * ) Notice: Subject to any disclaimer, the term of this patent is extended or adjusted under 35 U.S.C. 154(b) by 0 days.

(21) Appl. No.: 15/888,664

(22) Filed: Feb. 5, 2018

(65) Prior Publication Data
US 2018/0231448 A1 Aug. 16, 2018

(30) Foreign Application Priority Data
Feb. 15, 2017 (DE) .................... 10 2017 001 439

(51) Int. Cl.
*G01N 15/02* (2006.01)
*G01N 15/06* (2006.01)
(Continued)

(52) U.S. Cl.
CPC ......... *G01N 15/0211* (2013.01); *G01N 15/06* (2013.01); *G01N 15/1459* (2013.01);
(Continued)

(58) Field of Classification Search
CPC .................... G01N 15/0211; G01N 15/06
See application file for complete search history.

(56) References Cited

U.S. PATENT DOCUMENTS

| | | | |
|---|---|---|---|
| 2009/0039249 A1* | 2/2009 | Wang | G01N 15/0205 250/287 |
| 2018/0017477 A1* | 1/2018 | Mauro | G01T 1/178 |

OTHER PUBLICATIONS

Binnig, J. J.Meyer, G.Kasper, "Calibration of an optical particle counter to provide PM2.5 mass for well-defined particle materials," Journal of Aerosol Science, Aerosol Science 38, pp. 325-332, 2007.*

* cited by examiner

*Primary Examiner* — Rebecca C Bryant
(74) *Attorney, Agent, or Firm* — Andrew Wilford

(57) ABSTRACT

A particle-measuring apparatus (1) for determining the particle mass concentration in aerosols having different properties has an aerosol photometer (2), by means of which a photometer measured value, which is dependent on the particle mass concentration in the aerosol, can be measured, and an evaluation unit (9), into which photometer measured values measured by the aerosol photometer (2) can be input and in which the input photometer measured values can be processed in order to output corrected particle mass concentration values.

In order to provide a particle-measuring apparatus or a corresponding method that can be used to determine the particle mass concentration in a mobile manner, for example in a vehicle, or with different aerosol properties in different regions, it is proposed that respective calibration factors are stored in a memory (17) of the evaluation unit (9) for different aerosols, in that the particle-measuring apparatus (1) has an optical particle counter (10), by means of which the particle size distribution of aerosols can be detected and can be input into the evaluation unit (9) of the particle-measuring apparatus (1), in that the particle size distribution currently detected by the optical particle counter (10) can be compared in the evaluation unit (9) with particle size distributions, stored in the memory (17) of the evaluation unit (9), of the different aerosols associated with the stored calibration factors, and in that, by means of the evaluation unit (9), the stored calibration factor associated with the aerosol for which the particle size distribution has the most matches with the particle size distribution currently detected by the optical particle counter (10) can be selected for a (Continued)

determination of the particle mass concentration of the aerosol currently being measured.

1 Claim, 2 Drawing Sheets

(51) Int. Cl.
*G01N 15/14* (2006.01)
*G01N 21/85* (2006.01)
*G01N 21/53* (2006.01)
G01N 15/00 (2006.01)

(52) U.S. Cl.
CPC .............. *G01N 21/53* (2013.01); *G01N 21/85* (2013.01); *G01N 2015/0046* (2013.01); *G01N 2015/0693* (2013.01); *G01N 2015/1486* (2013.01); *G01N 2021/8578* (2013.01)

PARTICLE-MEASURING APPARATUS

FIELD OF THE INVENTION

The invention relates to a particle-measuring apparatus for determining the particle mass concentration in aerosols having different properties, comprising an aerosol photometer that can determine a photometer measured value that is dependent on the particle mass concentration in the aerosol, and comprising an evaluation unit, into which photometer measured values measured by the aerosol photometer can be input and in which the input photometer measured values can be processed in order to output corrected particle mass concentration values, and to a corresponding method for determining the particle mass concentration in aerosols having different properties.

BACKGROUND OF THE INVENTION

An aerosol is understood to mean particles in liquid or solid phase suspended in air or a carrier gas in the airborne state. The aerosol is considered to be a disperse system formed of solid or liquid particles that are finely distributed in air or a carrier gas.

Aerosols are characterized by single basic features. A single individual aerosol particle is described by three features, specifically shape, size and substance. The aerosol as an accumulation of many individual particles or as a particle collective is described in greater detail by further properties, specifically concentration and particle size distribution.

Optical particle sensors often work with electromagnetic radiation in a wavelength range of from 600 nm to 780 nm.

The wavelength range of 380 nm to 780 nm is also referred to as light, since it lies within the range perceived by the human eye.

Hereinafter, the term "light" will therefore also be used instead of the term "electromagnetic radiation", since the term "light" includes the range of electromagnetic wavelengths usual for optical particle sensors.

A wavelength of approximately 655 nm is often used, since there are very economical laser diodes with this wavelength as a source for the required light.

In order to measure the particle mass concentration, aerosol photometers (APMs) are used that are also referred to in the technical literature as "light-scattering nephelometers".

Aerosol photometers measure the concentration in a particle collective. The measurement result is the particle mass concentration. This is often specified in $mg/m^3$.

Due to their operating principle, aerosol photometers can be used with particle mass concentrations up to several 100 $mg/m^3$.

Either laser diodes or light-emitting diodes (LEDs) are used as monochromatic light sources for aerosol photometers. LEDs are used in economical aerosol photometers. In principle, optical smoke detectors for example fall under the group of aerosol photometers.

In the case of aerosol photometers a zero-point adjustment must be made regularly, since contamination and ambient influences lead to a drift of the zero point. High-quality aerosol photometers are provided with means so as to be able to perform this zero-point adjustment automatically. To this end, the aerosol is firstly guided through a filter or over a separator, so that there are no longer any detectable particles in the measurement volume. The "correction value" then recorded is stored and subtracted from the photometer measured values in the subsequent aerosol measurements. The difference is then output as the photometer measured value.

When it comes to taking ambient measurements in cities, aerosol photometers are suitable measurement apparatuses. In heavily loaded cities, partial particle mass concentrations of more than 0.4 $mg/m^3$ are sometimes measured.

Another class of optical particle sensors is constituted by optical particle counters (OPCs). These measurement apparatuses also use the effect of light scattering in aerosols. However, in contrast to aerosol photometers, it is not a particle collective that is measured, but instead individual particles. To this end, the optical and electrical requirements are much higher than in the case of aerosol photometers. In the case of an aerosol photometer, the light scattered by thousands of particles is detected. Since, in the case of an optical particle counter, only the light scattered by an individual particle is detected, a much higher sensitivity and/or light intensity is necessary.

The optical measurement volume, which in aerosol photometers can easily be several 100 to 1000 $mm^3$, has to be made much smaller in the case of optical particle counters. If, for example, 1000 particles per $cm^3$ are to be measured error-free with an optical particle counter, the optical measurement volume must be only approximately 0.5 $mm^3$ in size. It is thus ensured that only one particle is ever located in the optical measurement volume, up to a particle number concentration of 1000 particles per $cm^3$. There are approximately 1000 particles per $cm^3$ for example in Shanghai with a PM2.5 air load of 120 $\mu g/m^3$.

At higher particle number concentrations, what are known as coincidence errors occur.

There are then a number of particles simultaneously in the optical measurement volume. These particles are then detected as an individual particle and are classified in an incorrect size class. This produces errors in the measurement result.

These coincidence errors mean that, in the above-mentioned case, this optical particle counter can no longer be used already from a relatively low load of 120 $\mu g/m^3$.

Optical particle counters, however, do have some technical advantages with regard to their usable concentration range compared to aerosol photometers.

Optical particle counters do not have a zero-point drift, since a signal shape is assessed rather than a signal value.

Besides the number of particles, the particle size distribution (PSD) can also be detected on the basis of the signal shapes.

Optical particle counters calculate the particle mass concentration in an aerosol by dividing the detected particle sizes into size classes (bins) and measuring the frequency of occurrence for each size class or for each bin. Each size class or each bin is assigned a specific weighting factor that, multiplied by the frequency of occurrence, gives the particle mass for this size class or for this bin.

If the particle masses of all relevant size classes or bins are added together, this gives the total mass concentration.

In order to calculate PM2.5, the particle masses of all size classes or bins up to a particle size of 2.5 $\mu m$ diameter are added together.

In order to calculate PM10, the particle masses of all size classes or bins up to a particle size of 10 $\mu m$ are added together.

Optical particle counters respond in a much more robust manner to changes to the particle size distribution in the aerosol. If the particle size distribution in the aerosol changes towards large particles, the mass is underestimated with aerosol photometers, since the mass of a particle grows with the square of the surface area. The scattered light, however, is linear to the surface.

The aerosol photometers (APM) already mentioned above are measurement instruments of relatively simple structure. With a particle-measuring apparatus based on aerosol photometers of this kind, it is therefore generally only possible to estimate the particle mass concentration in the air or in the carrier gas, because the aerosol photometers always detect the optical properties of the totality of all aerosol constituents located in the measurement volume. Aerosol photometers measure a particle collective. No information regarding individual particles can be obtained from the detected signal of the scattered light.

In order to obtain the correct particle mass concentration from the detected signal, a key precondition must be met, specifically the complex properties of the aerosol to be measured as particle collective must correspond to those of the aerosol used for the calibration of the aerosol photometer.

The complex properties of an aerosol are particle size, particle size distribution, moisture, refractive index, and density.

It is first assumed that the complex properties of the aerosol to be measured are known and are constant.

The calibration is then performed for example as follows:

The aerosol photometer is calibrated with the aerosol to be measured. The procedures for this are described in detail in the handbooks of the aerosol photometers and in the instructions provided by the measurement apparatus manufacturer. Here, the mass concentration of the aerosol is always measured over a sufficient period of time with the factory calibration setting of the aerosol photometer, and the aerosol is guided after the aerosol photometer through a filter or over a separator. At the end of the measurement, the deposited mass is determined by weighing. The result of the weighing is not influenced by the optical particle properties, nor is it falsified by the particle size distribution or density differences of individual particles.

A correction factor K is then calculated from the two measured values obtained. This value K is stored in the aerosol photometer as a correction factor, also referred to as a calibration factor, or specific calibration value. The photometer measured values of the aerosol photometer are then multiplied by K in order to attain the correct particle mass concentration.

Problems occur when one or more of the complex aerosol properties of the aerosol to be measured change.

For example, the factory calibration factor can lead in environmental measurements to an overestimation of the particle mass concentration.

The factory calibration is performed using a test dust. The used test dust is known as "Arizona Road Dust A1". This dust is standardized according to ISO12103A1.

The reason for the overestimation, inter alia, is the different density of the calibration dust compared to the average density of the dust particles in the ambient air.

The average dust density in the ambient air is not constant, and instead is dependent on many environmental factors. In the literature, a value of 1.6 to 1.7 $g/cm^3$ is often found. The calibration dust, however, has a density of 2.65 $g/cm^3$.

OBJECTS OF THE INVENTION

Proceeding from the above-discussed prior art, the object of the invention is to provide a particle-measuring apparatus for determining the particle mass concentration in aerosols having different properties, and a corresponding method, which device and method, respectively, can be used and carried out in order to determine the particle mass concentration in a mobile manner, for example in a vehicle, when both different aerosol properties in different regions, which can result in large measurement deviations, and seasonal changes of aerosol properties, for example in winter on account of increased heating operation that likewise can lead to large measurement deviations, have to be taken into consideration and/or compensated.

SUMMARY OF THE INVENTION

This object is achieved in that respective calibration factors are stored in a memory of the evaluation unit for different aerosols, in that the particle-measuring apparatus has an optical particle counter, by means of which the particle size distribution of aerosols can be detected and can be input into the evaluation unit of the particle-measuring apparatus, in that the particle size distribution currently detected by the optical particle counter can be compared in the evaluation unit with particle size distributions, stored in the memory of the evaluation unit, of the different aerosols associated with the stored calibration factors, and in that, by the evaluation unit, the stored calibration factor associated with the aerosol for which the particle size distribution has the most matches with the particle size distribution currently detected by the optical particle counter can be selected for a determination of the particle mass concentration of the aerosol currently being measured.

With regard to the method according to the invention, the object is achieved in that respective calibration factors are stored for different aerosols, in that the particle size distribution of aerosols is detected by an optical particle counter, in that the particle size distribution currently detected by the optical particle counter is compared with stored particle size distributions of the different aerosols associated with the stored calibration factors, and in that the stored calibration factor associated with the aerosol for which the particle size distribution has the most matches with the particle size distribution currently being detected by the optical particle counter is selected for a determination of the particle mass concentration of the aerosol currently being measured.

In accordance with the invention, corrected particle mass concentration values can be provided for the aerosols to be measured currently, which corrected values correspond better to the actual particle mass concentration values of the aerosols to be measured or detected than in the case of the particle-measuring apparatuses and corresponding methods known from the prior art.

In accordance with an advantageous development of the particle-measuring apparatus according to the invention and of the method according to the invention, an adapted calibration factor is interpolated in the evaluation unit of the particle-measuring apparatus from two stored calibration factors of which the particle size distributions have the most matches with the particle size distribution detected currently by the optical particle counter and can be used as a basis for determining the particle mass concentration of the measured aerosol. The corrected particle mass concentration values can thus be brought even closer to the actual particle mass concentration values of the aerosols currently being measured.

In order to avoid a sudden change in the corrected particle mass concentration values, it is advantageous if, in the event of a change to the interpolated calibration factor on account of a change in the particle size distribution detected by the optical particle counter, the calibration factor that can form the basis of the determination of the particle mass concentration of the measured aerosol can be faded over or transitioned gradually, over a predefined period of time, in the evaluation unit of the particle-measuring apparatus from the interpolated calibration factor used prior to the change into the interpolated calibration factor after the change.

BRIEF DESCRIPTION OF THE DRAWING

The invention will be explained in greater detail on the basis of an embodiment with reference to the drawings, in which.

SPECIFIC DESCRIPTION OF THE INVENTION

Figure 1:
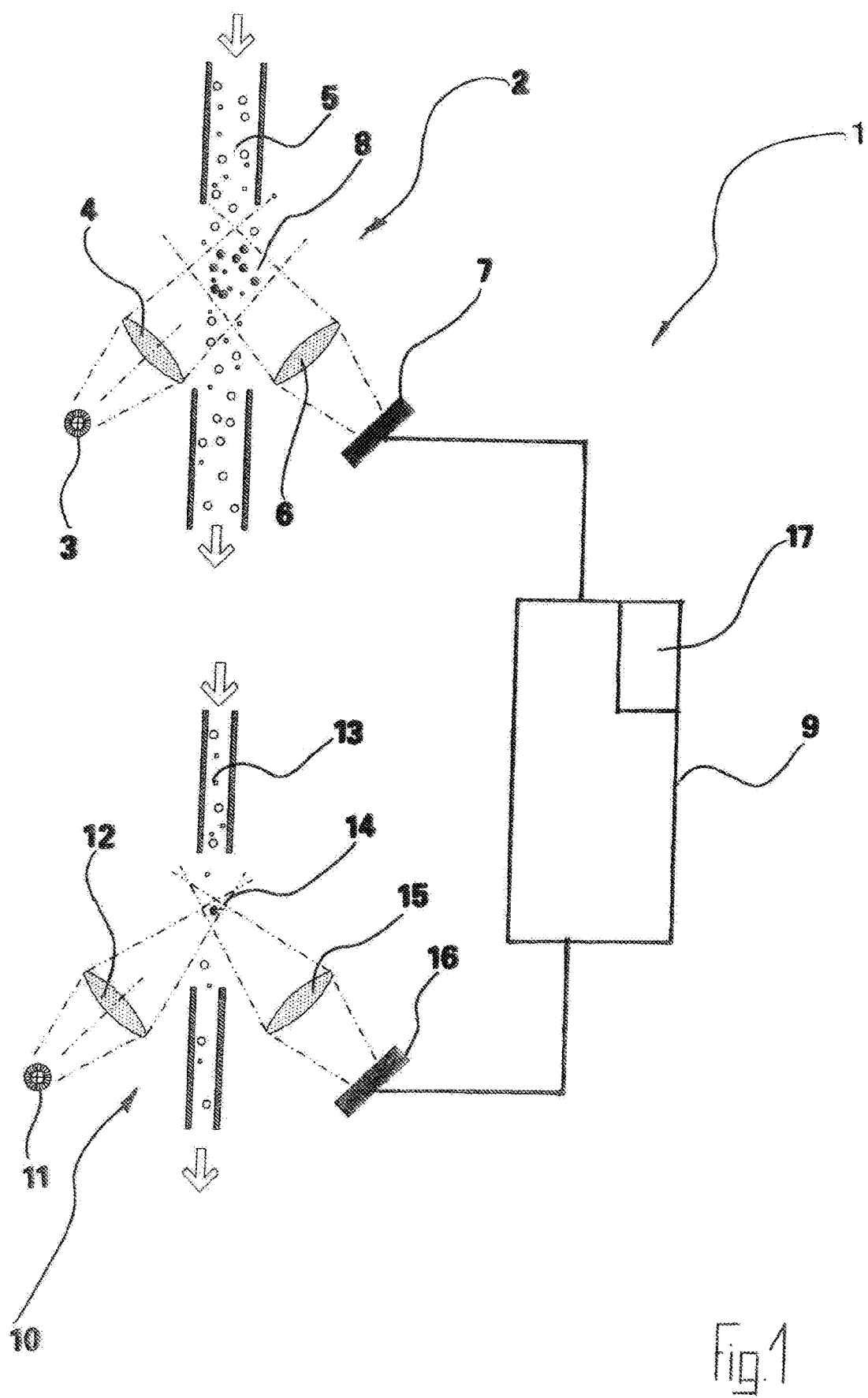
FIG. 1 shows a basic depiction of an embodiment of a particle-measuring apparatus according to the invention for determining the particle mass concentration in aerosols having different properties.

An embodiment of a particle-measuring apparatus 1 according to the invention shown in a basic depiction in FIG. 1 is used to determine the particle mass concentration in aerosols having different properties. In the method for determining the particle mass concentration that can be carried out by the embodiment of the particle-measuring apparatus 1 shown in FIG. 1, the most closely matching calibration factor K is automatically determined for an aerosol photometer 2 of the particle-measuring apparatus 1, wherein this calibration factor K is determined from a field of calibration factors, as will be described hereinafter in greater detail.

The aerosol photometer 2 has a monochromatic light source 3 that can be configured as a laser diode or as a light-emitting diode (LED). The light radiation emitted by the monochromatic light source 3 of the aerosol photometer 2 is bundled in an optical lens 4. The light beam leaving the optical lens 4 passes through a gas flow 5 that entrains the aerosol to be measured. Light is reflected in the direction of a further optical lens 6 or a reflector 7 arranged thereafter by particles of the aerosol contained in the gas flow 5. By means of the two optical lenses 4, 5, the measurement volume 8 depicted in principle in FIG. 1 is provided. The light radiation directed in the measurement volume 8 in the direction of the reflector 7 on account of the particles of the aerosol provided there and bundled by the optical lens 6 is detected at the reflector 7, wherein a photometer measured value corresponding to the detected light radiation is forwarded to an evaluation unit 9 of the particle-measuring apparatus 1.

The photometer measured value forwarded from the reflector 7 of the aerosol photometer 2 to the evaluation unit 9 corresponds to the particle loading provided or detected in the measurement volume 8.

Since aerosols that differ in terms of their particle size distribution (PSD) at an identical particle load lead to different photometer measured values detected at the reflector 7 of the aerosol photometer 2 and forwarded to the evaluation unit 9 of the particle-measuring apparatus 1, the photometer measured values input into the evaluation unit 9 of the particle-measuring apparatus 1 can be processed in the evaluation unit 9 so as to be able to output corrected particle mass concentration values from the evaluation unit 9 that better correspond to the actual particle mass concentration values of the aerosols to be measured.

To this end, the particle-measuring apparatus 1 shown in FIG. 1 is designed with an optical particle counter 10.

The optical particle counter 10 of the particle-measuring apparatus 1 shown in FIG. 1 likewise has a monochromatic light source 11 that can be formed as a laser diode or light-emitting diode (LED). The monochromatic light source 11 emits light radiation that is bundled in an optical lens 12. The light beam bundled in the optical lens 12 crosses a gas flow 13 that carries the aerosol to be measured. A measurement volume 14 of the optical particle counter 10 is significantly smaller than the measurement volume 8 of the aerosol photometer 2. This is achieved in the exemplary embodiment, shown in FIG. 1, of the optical particle counter 10 in that the light emitted by the monochromatic light source 11 is focused much more heavily by the optical lens 12 than by the optical lens 4 the aerosol photometer 2. The measurement volume 14 of the optical particle counter 10 is dimensioned under consideration of the expectable values of aerosols to be measured, such that merely a single particle of the aerosol is provided therein. The light radiation reflected by the optical particle counter 10 in the measurement volume 14 of the optical particle counter 10 is directed by an optical lens 15 to a reflector 16 of the optical particle counter 10 disposed in the beam path, after the optical lens 15. For each individual particle of the aerosol flowing through the measurement volume 14 of the optical particle counter 10 together with the gas flow 13, an individual measured value corresponding to an individual particle is thus forwarded at the reflector 16 of the optical particle counter 10 to the evaluation unit 9 of the particle-measuring apparatus 1. Each individual measured value corresponds to the light reflected by a single particle of the aerosol to be measured and directed by the optical lens 15 to the reflector 16 of the optical particle counter 10.

In contrast to the aerosol photometer 2 described above, the optical particle counter (OPC) detects individual particles. Optical particle counters 10 of this kind are used to measure relatively low particle concentrations, for example in interior spaces. Within the scope of their field of application, that is to say at relatively low to average particle number concentrations that can usually lie between 1000 and 20,000 particles/cm$^3$, high-quality information with regard to the particle number and the particle size distribution in the aerosol is possible by optical particle counters 10. Two parameters which cannot be obtained by an aerosol photometer 2 are thus provided for an aerosol.

Here, the particle size distribution of an aerosol is to be assessed as a "fingerprint" of the aerosol so to speak. A calibration factor K associated with the aerosol in question can be determined on the basis of this "fingerprint" and can be taken into consideration in the evaluation in the evaluation unit.

Calibration factors K1, K2, K3 and K4 for different aerosols to be measured during the course of a measurement period are stored in a memory 17 of the evaluation unit 9 of the particle-measuring apparatus 1 shown in FIG. 1 and are each associated with a respective aerosol. Different aerosols thus have different calibration factors. In addition, for each aerosol stored with its associated calibration factor in the memory 17 of the evaluation unit 9, the associated particle size distribution is also stored in the memory 17 as a "fingerprint" of the aerosol in question.

Figure 2:
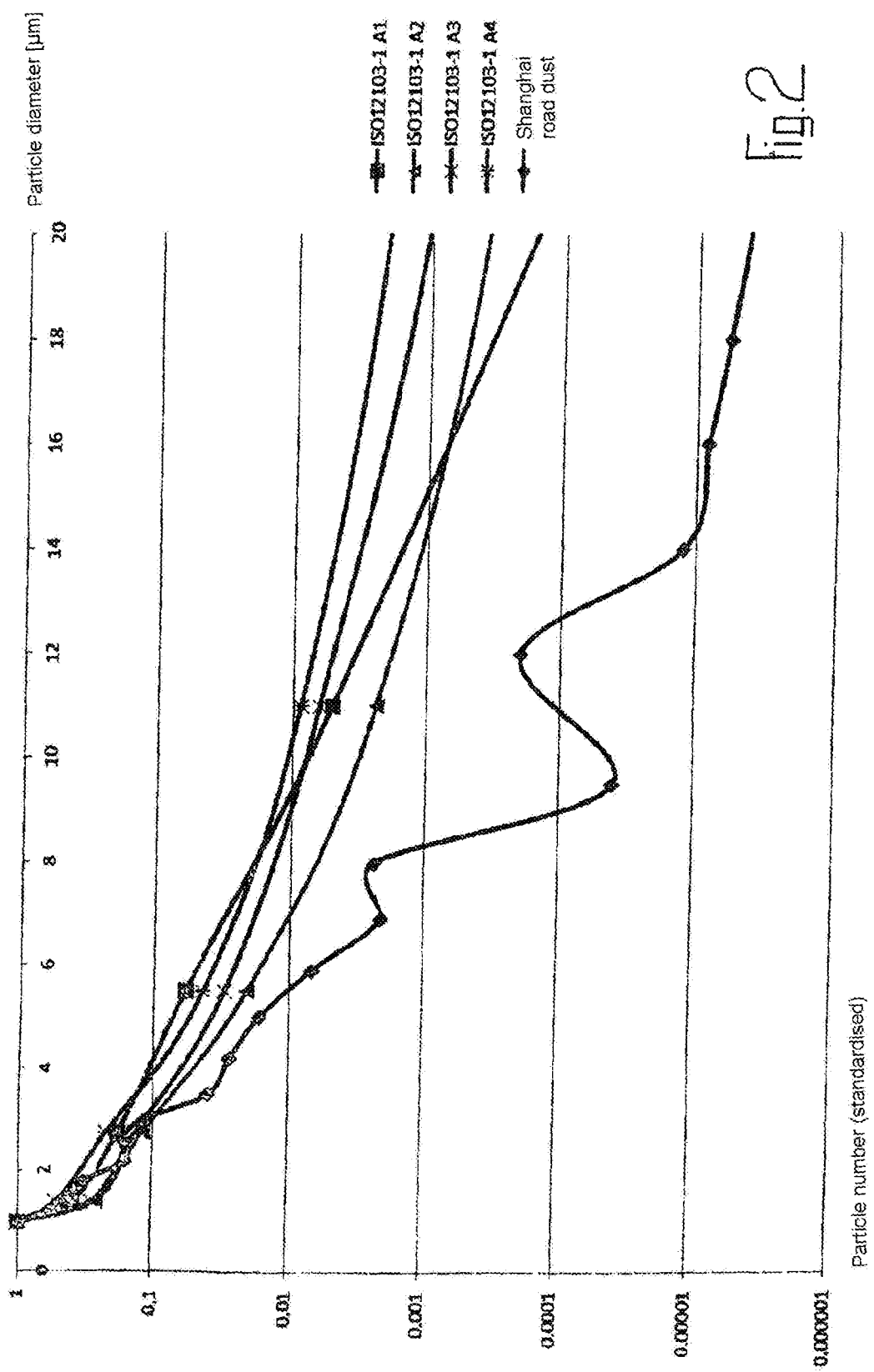
FIG. 2 is a graph depicting the particle size distribution of different aerosols.

FIG. 2 shows the particle diameter and particle number or standardized particle number four different aerosols A1, A2, A3 and A4, wherein the aerosol formed by the road dust in Shanghai is shown by way of comparison.

In the case of the particle-measuring apparatus according to the invention or method performed therewith for determining the particle mass concentration in aerosols having different properties, the aerosol photometer 2 is calibrated with all aerosols to be expected over a measurement period, prior to starting up the particle-measuring apparatus 1. However, the calibration table stored in the memory 17 of the evaluation unit 9 contains not only the calibration factors determined in this way. In addition to each calibration factor, the particle size distribution of the associated aerosol is also stored.

A match with regard to the "fingerprint" or the particle size distribution between an aerosol that is currently being measured and an aerosol for which the calibration factor and particle size distribution are listed in the calibration table stored in the memory 17 of the evaluation unit 9 is ascertained in accordance with known pattern recognition methods. Pattern recognition methods of this kind generally give a match value between 0 (no match) and 1 (full match).

If, during the evaluation in the evaluation unit 9 it is found that the match value reaches or exceeds a freely predefinable or predeterminable threshold value, which for example can be 0.9, the calibration factor that can be deduced in accordance with the calibration table can be directly applied.

Seasonal changes in the aerosol to be measured, for example at the start of the hot period, lead, with regard to the composition of the aerosol, to transition states between the state of the aerosol before the start of the hot period and the state of the aerosol after the start of the hot period, since generally not all heating devices are switched on at the same time. This state transition can last for several weeks.

Accordingly, in the case of a particle-measuring apparatus 1 used in a mobile manner, for example in a motor vehicle, transition states can occur during a journey from an industrial town to a country environment or the like.

If, for an aerosol that is currently being measured by the particle-measuring apparatus 1, it is not possible to find an aerosol entered into the calibration table that has a high match value with the aerosol currently being measured, a calibration factor K can be interpolated by a numerical method between the two table entries for aerosols having the highest match values with the aerosol currently being measured.

This will be explained in greater detail hereinafter on the basis of a result table created in the evaluation unit 9 of the particle-measuring apparatus 1. This result table is presented below:

| Number | Match | Calibration Factor |
|---|---|---|
| 1 | 0.3 | 1.0 |
| 2 | 0.8 | 2.0 |
| 3 | 0.7 | 3.0 |
| 4 | 0.2 | 4.0 |

The left-hand column of the table shows the number of the four aerosols stored in the table. The right-hand column of the table shows the calibration factors associated with the respective aerosols. The middle column of the table shows the match value between the aerosol currently being measured and the aerosols stored in the table.

It is clear from the result table shown above that the aerosol currently being measured has a match value of 0.8 with aerosol no. 2 and has a match value of 0.7 with aerosol no. 3. Aerosol no. 2 is assigned a calibration factor of 2.0, and aerosol no. 3 is assigned a calibration factor of 3.0. Since aerosol nos 2 and 3 have the highest matches with the aerosol currently being measured, specifically 0.8 and 0.7, the interpolated calibration factor is calculated as follows:

$$K_{interpolated} = (0.8 \times 2.0 + 0.7 \times 3.0)/(0.8 + 0.7) = 2.47.$$

The interpolated calibration factor can be determined at any moment in time. A determined interpolated calibration factor is used until a new interpolated calibration factor has been determined.

In addition, a fall-back level can be defined, for the case in which it is not possible to determine an interpolated calibration factor. This can be the case for example if only low match values, for example excluding match values below 0.25, can be found in the result table. A calibration factor defined as standard is then used.

A newly determined calibration factor does not have to be used immediately in the evaluation in the evaluation unit 9, since this could lead to jumps in the corrected particle mass concentration values output by the evaluation unit 9, which could be irritating for the user.

Rather, it is possible to gradually transition or fade over so to speak in an arbitrarily predefinable time interval from the current calibration factor to the newly determined calibration factor. The predefinable time interval can be selected to be between a few seconds and a few hours or days depending on the application.

In the further table presented hereinafter, the particle size distributions (PSD) of different aerosols A1, A2, A3 and road dust are shown. In the table, the particle size distribution is standardized to the particle number for the particles having a maximum diameter of 1 μm.

As an example of a particle size distribution or a "fingerprint", the standardized values for the particle sizes 2 μm, 4 μm and 6 μm are taken from the graph shown in FIG. 2 and are stored in the table.

| Aerosol | 2 μm | 3 μm | 4 μm | Calibration value |
|---|---|---|---|---|
| A1 | 0.26 | 0.1 | 0.048 | K1 |
| A2 | 0.16 | 0.058 | 0.014 | K2 |
| A3 | 0.18 | 0.068 | 0.022 | K3 |
| Road Dust | 0.21 | 0.03 | 0.005 | K4 |

The above-described method can also be easily used with optical particle counters 10, since the particle size distribution of the aerosol to be detected or to be measured is indeed provided by such a counter.

The optical particle counter 10 calculates the particle mass concentration in the aerosol to be measured by dividing the detected particle sizes into size classes (bins) and detecting the number of particles for each size class.

Each size class or each bin is assigned a specific weighting factor that, when multiplied by the number of particles, gives the particle mass for this size class or for this bin.

If the particle masses of all relevant size classes or bins are added, this gives the total particle mass concentration.

In order, for example, to calculate the total particle mass concentration to a maximum particle diameter of 2.5 μm, referred to as PM2.5 for short, the particle masses of all size classes or bins up to the maximum particle size (2.5 μm diameter) are added together.

In order to calculate PM10, the particle masses of all size classes or all bins up to a maximum particle size with a diameter of 10 μm are added together.

When the density of the particles in the aerosol deviates from the density for which the calibration factor K has been determined, errors occur in the measured value.

When only optical particle counters 10 are being used, it is thus expedient to determine the most suitable calibration factor K from a calibration table by the "fingerprint" of the particle size distribution.

The invention claimed is:

1. A method for determining the particle mass concentration in aerosols having different properties, comprising the steps of:
  with an aerosol photometer determining a photometer measured value corresponding to the particle mass concentration in a test aerosol,
  with an optical particle counter, determining a counter-measured value corresponding to the particle-size distribution in the test aerosol,
  processing the photometer measured values and the counter-measure values are processed in order to output corrected particle mass concentration values,
  storing respective calibration factors are stored for different aerosols,
  comparing the particle size distribution currently detected by the optical particle counter and particle mass concentration detected by the aerosol photometer with the stored particle size distributions of the different aerosols associated with the stored calibration factors, and selecting the stored calibration factor associated with the aerosol for which the particle size distribution has the most matches with the particle size distribution currently being detected by the optical particle counter for a determination of the particle mass concentration of the aerosol currently being measured,
  interpolating an adapted calibration factor from two stored calibration factors of which the particle size distributions have the most matches with the particle size distribution detected currently by the optical particle counter and using the interpolated calibration factor as a basis for determining the particle mass concentration of the measured aerosol,
  in the event of a change to the interpolated calibration factor on account of a change in the particle size distribution detected by the optical particle counter, gradually transitioning the calibration factor that can form the basis of the determination of the particle mass concentration of the measured aerosol, over a predefined period of time from the interpolated calibration factor used prior to the change into the interpolated calibration factor after the change.

* * * * *